United States Patent Office

Re. 25,488

Reissued Nov. 26, 1963

25,488

HIGH SMOKE POINT FRYING OIL

Vigen K. Babayan, Livingston, N.J., assignor to E. F. Drew & Co., Inc., New York, N.Y., a corporation of Delaware No Drawing. Original No. 2,998,319, dated Aug. 29, 1961, Ser. No. 652,084, Apr. 11, 1957. Application for reissue Apr. 5, 1962, Ser. No. 188,918
11 Claims. (Cl. 99—118)

Matter enclosed in heavy brackets [ ] appears in the original patent but forms no part of this reissue specification; matter printed in italics indicates the additions made by reissue.

The present invention relates to a new and improved product adapted for use for deep fat frying of food. More particularly, the invention relates to vegetable oils which have improved smoking characteristics and may be utilized in many industrial and household uses where heretofore excessive smoking made their use undesirable.

In the vegetable oil industry, for years difficulties have been encountered due to the smoking tendencies of oils subjected to elevated temperatures. For instance, in frying operations where temperatures of 375° F. to 425° F. and higher may be employed, certain oils such as corn, cottonseed and peanut oil are now extensively used for frying operations since the extent of their smoking is considered fairly moderate. Hydrogenated oils, stearines, shortenings, are also used in frying operations since their smoking tendencies are somewhat superior to that of the former group. In both groups their excessive smoking is still an undesirable factor which one would prefer to eliminate or reduce appreciably. Smoking causes manufacturing operations to be difficult and the food being fried to char or have an objectionable taste. It is also messy and in general undesirable on a large scale frying operation, causing breakdown and decomposition of the oil on prolonged heating.

In contrast to the above groups, oils such as coconut, babassu, tucum and palm kernel, included in the coconut type of oil, have been found to show substantial smoking when used in the high temperature frying operations. Although they otherwise exhibit excellent flavor, stability and storage qualities, these oils have not found extensive use as frying oils because of their smoking tendencies.

The present invention is intended and adapted to overcome the difficulties and disadvantages inherent in prior compositions of the type described, it being among the objects thereof to provide a product which does not develop smoke or disagreeable odors during frying operations.

It is also among the objects of the present invention to provide a composition in which the improved smoke point characteristics are of long duration and in which the frying operation may be conducted at high temperatures without undesirable effects.

It is further among the objects of the present invention to provide a composition of a coconut type oil which heretofore has not been suitable for commercial frying and make it available for such use by greatly reducing the smoking tendency thereof.

The invention comprises the following: The vegetable oils described above are treated with a small amount of an agent capable of being intimately dispersed in the oil. The agent is preferably dispersed by the use of a homogenizer, a colloid mill or similar device capable of adequately mixing and intimately dispersing the agent in the oil. The agent may be dispersed in a small volume of the oil and then this concentrate can be used to blend the entire batch being modified. Concentrations from 1 to 2 parts per million to several thousand parts per million may be employed but generally concentrations of 5 to 30 parts per million give satisfactory results, for example, 10 parts per million.

The class of compounds capable of bringing about this increase in the smoke point in the vegetable oils at frying temperatures are the silicone oils (organo polysiloxanes), reaction products of silanes. These silicone oils when used in viscosity ranges of [1,000] *100* centistokes to about 100,000 centistokes at 100° F. and in the minute quantities mentioned above, have the property of reducing or inhibiting the smoking tendencies of vegetable oils at the elevated temperatures.

Silicone oils having viscosities below 1,000 centistokes, although they show improved smoke point tendencies, do not produce a permanent effect and, therefore, they cannot be considered satisfactory for improving the smoke point. Silicone oils having viscosities above 100,000 centistokes present processing difficulties which make their use impractical. The silicone oils of high viscosity show progressively less tendency to become dispersed in the vegetable oil and present a processing, dispersing and storage problem. One may be able by diligent blending, mixing and processing to get these high viscosity oils eventually dispersed in the vegetable oil but on standing the silicone oil may come out of solution or dispersion and form an insoluble globule on the surface of the vegetable oil or at the bottom of the container.

One may employ carrier or coupling agents to blend the high viscosity silicone oils or even use silicone greases and silicone polymers approaching gels and elastomers but their use also leads to other undesirable considerations. In the preferred viscosity ranges indicated above, one is able to adequately disperse the silicone oil into the vegetable oil in the concentrations contemplated merely by the use of a colloidal mill or a homogenizer. The resulting oil is a homogeneous, clear oil showing no detectable difference when compared to the original vegetable oil. The small amount of silicone oil used, for example 10 to 20 parts per million, can only be detected when one resorts to specific, sensitive, analytical testing methods.

The silicone oils which are especially adapted for the present invention are the methyl and ethyl polysiloxanes. The range of viscosities of these polysiloxanes which are adapted for the present purpose is quite limited. For instance, the methyl polysiloxanes in order to be suitable need have viscosities ranging from [1,000] *100* to 100,000 centistokes at 100° F., the preferable range being between 1,000 and 30,000 centistokes. The ethyl polysiloxanes should have the viscosities ranging from [1,000] *100* to 100,000 centistokes at 100° F. with the preferable range being between 10,000 and 50,000 centistokes.

Only small amounts of such compounds are desirable to give the maximum effectiveness of the composition. In the case of the methyl polysiloxanes, from 1 to 25 parts per million of the oil being treated gives excellent results. The most preferred range is from 5 to 20 parts per million. In the case of the ethyl polysiloxanes, from 5 to 45 parts per million is suitable and the preferable range is from 15 to 45 parts per million. The additives contemplated herein imparting the improved smoke point characteristics to the vegetable oils have the general formula as follows:

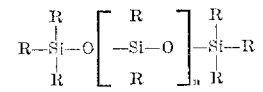

wherein R is a radical taken from the class consisting of methyl and ethyl and n is at least 10 and sufficiently large so that the said compounds has a viscosity of about [1,000] *100* to 100,000 centistokes at 100° F., the amount of said compound being sufficient to substantially reduce the smoking tendencies of said oil at the elevated temperatures used in frying foods.

The following table shows comparative results on the smoke point rise due to the addition of various amounts of methyl polysiloxanes having viscosities ranging from 100 to 100,000 centistokes. The examples shown below were run on cottonseed oil.

| Visc. of Methyl Polysiloxane added | p.p.m. added | Smoke Pt., ° F. |
|---|---|---|
| Blank | Blank | 440 |
| Cstks. at 100° F.: | | |
| 100 | 0.1 | 440 |
| 100 | 1 | 455 |
| 100 | 10 | 465 |
| 100 | 100 | 465 |
| 1,000 | 0.1 | 440 |
| 1,000 | 1 | 455 |
| 1,000 | 10 | 465 |
| 1,000 | 100 | 460 |
| 5,000 | 0.1 | 440 |
| 5,000 | 1 | 460 |
| 5,000 | 10 | 460 |
| 5,000 | 100 | 450 |
| 10,000 | 0.1 | 440 |
| 10,000 | 1 | 450 |
| 10,000 | 5 | 460 |
| 10,000 | 10 | 465 |
| 10,000 | 100 | 460 |
| 28,000 | 0.1 | 445 |
| 28,000 | 1 | 450 |
| 28,000 | 10 | 465 |
| 28,000 | 100 | 460 |
| 50,000 | 0.1 | 440 |
| 50,000 | 1 | 450 |
| 50,000 | 10 | 465 |
| 50,000 | 100 | 460 |
| 100,000 | 0.1 | 440 |
| 100,000 | 1 | 440 |
| 100,000 | 10 | 465 |
| 100,000 | 100 | 465 |

The above compositions were prepared by mixing master batches of 100 parts per million of each of the various viscosities of silicone oils in cottonseed oil and blending in an Eppenbach mill at maximum r.p.m. for five minutes. Dilutions of these solutions were then made to obtain the desired concentration range.

The smoke point was determined in each case in accordance with the method promulgated by the American Oil Chemists Society as "Method Cc9a–48."

After repeated fryings, it was found that the smoke point rise engendered by the 100 centistoke viscosity siloxane was not permanent.

It was also noted that the 100,000 centistoke viscosity oil was blended with great difficulty and although it is effective to raise the smoke point, as a practical matter it is too viscous for easy commercial handling.

It should be noted that the foregoing example represents the preferred form of the invention, namely the use of methyl polysiloxane as opposed to ethyl polysiloxane.

Further test were conducted on various other types of vegetable oils using the optimum viscosity of 10,000 centistokes and the optimum concentration of 10 parts per million. The results of those experiments are tabulated below:

| Type Vegetable Oil | Visc. of Methyl Polysiloxane added at 100° F. | p.p.m. added | Smoke Pt. |
|---|---|---|---|
| Corn | Blank | | 425 |
| Corn | 10,000 | 10 | 445 |
| Peanut | Blank | | 455 |
| Peanut | 10,000 | 10 | 470 |
| Coconut | Blank | | 270 |
| Coconut | 10,000 | 10 | 300 |
| Soya | Blank | | 425 |
| Soya | 10,000 | 10 | 455 |

It is quite apparent from the foregoing that these additives are effective on all types of vegetable oils.

The phenomenon of excessive smoking is particularly intensified when a member of the coconut type oil family is added to liquid oils of other types. Interesterification reduces the tendency to smoke but not to an acceptable point, whereas the addition of the silicone oil to the interesterified product reduces the tendency towards smoking to that normally encountered in frying oils.

The product of the interesterification of a mixture of 80% coconut oil with 20% cottonseed oil was washed, refined, bleached and deodorized. To this product was added 10 parts per million of methyl siloxane having a viscosity of 10,000 centistokes. The smoke point of the interesterified product without siloxane additive was 360° F.; upon addition of methyl siloxane as described above, the smoke point rose to 385° F.

In case some difficulty arises in incorporating the siloxane compound into the oil being treated, a small amount of a compound such as glycerine or propylene glycol may be used. These compounds act as mutual solvents and appreciably aid in the dispersal of the siloxanes throughout the oil.

Any known method of making the siloxanes may be used, such as the process described by Burkhard and Rockow in an article entitled "The Present State of Organosilicon Chemistry" in Chemical Reviews, vol. 41 No. 1, August 1947. A coconut type oil may be interesterified with both vegetable and animal oils such as corn, peanut, tallow or others. Also the relative amounts of such oils may be varied within wide limits. Generally speaking, the amount of mutual solvent used is quite small, being not over about 5 parts based on the oil.

While only certain specific embodiments of this invention have been specifically disclosed, nevertheless the subject matter thereof is to be broadly construed and not to be limited except by the character of the claims appended hereto.

*This application is a continuation-in-part of application Serial No. 342,888, filed March 17, 1953, now abandoned.*

What is claimed is:

1. A fatty glyceride for use in deep fat frying of foods having dispersed therein a compound taken from the class consisting of methyl and ethyl siloxanes, the amount of said methyl siloxane being from 1 to 25 parts per million and having a viscosity of 1,000 to 100,000 centistokes at 100° F., the amount of said ethyl siloxane being from 5 to 45 parts per million and having a viscosity of 1,000 to 100,000 centistokes at 100° F., said siloxanes not imparting any odor during frying operations, said compositions effectively raising the smoke point from 15° to 35° F. during a relatively large number of fryings.

2. A fatty glyceride according to claim 1, taken from the class consisting of cottonseed, corn, peanut, soya bean and coconut type.

3. A fatty glyceride according to claim 1, wherein the methyl siloxane is present in an amount of from 5 to 20 parts per million and the ethyl siloxane is present in an amount of from 15 to 45 parts per million.

4. A fatty glyceride according to claim 1 wherein said oil contains a mutual solvent for the constituents thereof taken from the class consisting of glycerine and propylene glycol.

5. A fatty glyceride according to claim 1 composed of a coconut type oil interesterified with another fatty acid triglyceride oil.

6. A fatty glyceride according to claim 1 wherein the glyceride is a coconut type oil.

7. A fatty glyceride according to claim 1 wherein said glyceride is corn oil.

8. A deep fat frying oil according to claim 3 wherein the methyl siloxane has a viscosity of from 1,000 to 30,000 centistokes at 100° F. and the ethyl siloxane has a viscosity of 10,000 to 50,000 centistokes at 100° F.

9. A deep fat frying oil according to claim 4 wherein the mutual solvent is present in an amount not over 5 parts based on said oil.

*10. A fatty glyceride adapted for use in the frying of foods having dispersed therein a compound taken from the class consisting of methyl and ethyl siloxanes, the amount of said methyl siloxane being from 1 to 25 parts*

*per million and having a viscosity of 100 to 100,000 centistokes at 100° F., the amount of said ethyl siloxane being from 5 to 45 parts per million and having a viscosity of 100 to 100,000 centistokes at 100° F.*

*11. A method of frying foods which comprises providing a mixture of a fatty glyceride having dispersed therein a compound taken from the class consisting of methyl and ethyl siloxanes, the amount of said methyl siloxane being from 1 to 25 parts per million and having a viscosity of 100 to 100,000 centistokes at 100° F., the amount of said ethyl siloxane being from 5 to 45 parts per million and having a viscosity of 100 to 100,000*

*centistokes at 100° F., heating said mixture to a sufficiently high temperature to fry foods, and then introducing into said mixture a food to be fried.*

References Cited in the file of this patent or the original patent

UNITED STATES PATENTS 2,634,213 Martin ---------- Apr. 7, 1953

OTHER REFERENCES

The Washington Post, Sunday, May 18, 1947, page 6B, paragraph beginning "Silicone."